United States Patent
Kagaya (10) Patent No.: US 12,552,200 B2
(45) Date of Patent: Feb. 17, 2026

(54) TIRE WITH SPECIFIED PROFILE

(71) Applicant: The Yokohama Rubber Co., LTD., Tokyo (JP)

(72) Inventor: Keisuke Kagaya, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 103 days.

(21) Appl. No.: 18/043,860

(22) PCT Filed: Jun. 17, 2021

(86) PCT No.: PCT/JP2021/023081
§ 371 (c)(1),
(2) Date: Mar. 2, 2023

(87) PCT Pub. No.: WO2022/049865
PCT Pub. Date: Mar. 10, 2022

(65) Prior Publication Data
US 2023/0331047 A1    Oct. 19, 2023

(30) Foreign Application Priority Data

Sep. 7, 2020  (JP) ................................ 2020-150131
Sep. 7, 2020  (JP) ................................ 2020-150132

(51) Int. Cl.
*B60C 3/04*    (2006.01)
*B60C 3/00*    (2006.01)
(Continued)

(52) U.S. Cl.
CPC .................. *B60C 3/04* (2013.01); *B60C 9/28* (2013.01); *B60C 11/0008* (2013.01);
(Continued)

(58) Field of Classification Search
CPC . B60C 11/0083; B60C 2013/007; B60C 3/04; B60C 2011/0033; B60C 3/00
See application file for complete search history.

(56) References Cited

U.S. PATENT DOCUMENTS 6,058,996 A    5/2000  Suzuki
9,254,718 B2   2/2016  Ohara
(Continued)

FOREIGN PATENT DOCUMENTS

DE    102012023298 A1    7/2013
JP    S63-180506 A       7/1988
(Continued)

OTHER PUBLICATIONS

English machine translation of WO 95/03945 A1, Feb. 9, 1995.*
(Continued)

*Primary Examiner* — Adrienne C. Johnstone
(74) *Attorney, Agent, or Firm* — Thorpe North & Western (57) ABSTRACT

In this tire, a distance GT from a tire outer surface profile at a tire ground contact edge to a tire inner surface, a distance GC from the tire outer surface profile at a position of 70% of a tire cross-sectional height to the tire inner surface, and a distance GD from the tire outer surface profile at a tire maximum width position to the tire inner surface satisfy conditions 1.00≤GC/GD≤1.10 and 3.00≤GT/GC≤4.00.

16 Claims, 5 Drawing Sheets

(51) Int. Cl.
  *B60C 9/28* (2006.01)
  *B60C 11/00* (2006.01)
  *B60C 13/00* (2006.01)
(52) U.S. Cl.
  CPC .......... *B60C 11/0083* (2013.01); *B60C 13/00* (2013.01); *B60C 2011/0033* (2013.01); *B60C 2013/007* (2013.01)

(56) References Cited

U.S. PATENT DOCUMENTS

| | | | |
|---|---|---|---|
| 9,902,211 | B2 | 2/2018 | Okazaki |
| 2004/0025998 | A1 | 2/2004 | Close |
| 2006/0180259 | A1 | 8/2006 | Kajita |
| 2017/0028782 | A1* | 2/2017 | Miyake |
| 2017/0028784 | A1* | 2/2017 | Suita ........................ B60C 3/04 |
| 2019/0375249 | A1 | 12/2019 | Mita |

FOREIGN PATENT DOCUMENTS

| | | | | |
|---|---|---|---|---|
| JP | 02204103 | A | * | 8/1990 |
| JP | 5-155209 | A | | 6/1993 |
| JP | H08-72506 | A | | 3/1996 |
| JP | 2003-205702 | A | | 7/2003 |
| JP | 2010036598 | A | * | 2/2010 |
| JP | 2012176694 | A | * | 9/2012 |
| JP | 2014-54967 | A | | 3/2014 |
| JP | 2015-003676 | A | | 1/2015 |
| JP | 2015127173 | A | | 7/2015 |
| JP | 6418339 | B1 | | 10/2018 |
| JP | 2019098976 | A | | 6/2019 |
| JP | 2019-137327 | A | | 8/2019 |
| JP | 2019-182071 | A | | 10/2019 |
| JP | 2019-209904 | A | | 12/2019 |
| WO | WO-95/03945 | A1 | * | 2/1995 |

OTHER PUBLICATIONS

English machine translation of JP 2-204103 A, Aug. 14, 1990.*
English machine translation of JP 2010-36598 A, Feb. 18, 2010.*
English machine translation of JP 2012-176694 A, Sep. 13, 2012.*
English machine translation of JP 8-72506 A, Mar. 19, 1996.*

* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|---|---|---|---|---|
| GG/GD | 1.80 | 1.08 | 1.05 | 1.02 | 1.05 | 1.05 | 1.05 | 1.05 | 1.05 | 1.05 | 1.05 | 1.05 | 1.05 |
| GT/GC | 2.40 | 3.00 | 3.00 | 3.00 | 3.10 | 3.20 | 3.45 | 3.20 | 3.20 | 3.20 | 3.20 | 3.20 | 3.20 |
| GA/GT | 1.00 | 1.00 | 1.00 | 1.00 | 1.00 | 1.00 | 1.00 | 1.02 | 1.05 | 1.08 | 1.05 | 1.05 | 1.05 |
| G1/GA | 0.73 | 0.73 | 0.73 | 0.73 | 0.73 | 0.73 | 0.73 | 0.73 | 0.73 | 0.73 | 0.67 | 0.60 | 0.52 |
| GE/GD | 1.11 | 1.11 | 1.11 | 1.11 | 1.11 | 1.11 | 1.11 | 1.11 | 1.11 | 1.11 | 1.11 | 1.11 | 1.11 |
| GF/GD | 1.60 | 1.60 | 1.60 | 1.60 | 1.60 | 1.60 | 1.60 | 1.60 | 1.60 | 1.60 | 1.60 | 1.60 | 1.60 |
| WC/SW | 0.96 | 0.96 | 0.96 | 0.96 | 0.96 | 0.96 | 0.96 | 0.96 | 0.96 | 0.96 | 0.96 | 0.96 | 0.96 |
| WE/SW | 0.94 | 0.94 | 0.94 | 0.94 | 0.94 | 0.94 | 0.94 | 0.94 | 0.94 | 0.94 | 0.94 | 0.94 | 0.94 |
| HD/SH | 0.54 | 0.54 | 0.54 | 0.54 | 0.54 | 0.54 | 0.54 | 0.54 | 0.54 | 0.54 | 0.54 | 0.54 | 0.54 |
| HU/SH | 0.19 | 0.19 | 0.19 | 0.19 | 0.19 | 0.19 | 0.19 | 0.19 | 0.19 | 0.19 | 0.19 | 0.19 | 0.19 |
| HF/SH | 0.16 | 0.16 | 0.16 | 0.16 | 0.16 | 0.16 | 0.16 | 0.16 | 0.16 | 0.16 | 0.16 | 0.16 | 0.16 |
| (HU-HF)/SH | 0.03 | 0.03 | 0.03 | 0.03 | 0.03 | 0.03 | 0.03 | 0.03 | 0.03 | 0.03 | 0.03 | 0.03 | 0.03 |
| ΔT/(TW/2) | 0.10 | 0.10 | 0.10 | 0.10 | 0.10 | 0.10 | 0.10 | 0.10 | 0.10 | 0.10 | 0.10 | 0.10 | 0.10 |
| Wbe/TW | 1.09 | 1.09 | 1.09 | 1.09 | 1.09 | 1.09 | 1.09 | 1.09 | 1.09 | 1.09 | 1.09 | 1.09 | 1.09 |
| SW/Wco | 1.27 | 1.27 | 1.27 | 1.27 | 1.27 | 1.27 | 1.27 | 1.27 | 1.27 | 1.27 | 1.27 | 1.27 | 1.27 |
| TW/Wco | 0.91 | 0.91 | 0.91 | 0.91 | 0.91 | 0.91 | 0.91 | 0.91 | 0.91 | 0.91 | 0.91 | 0.91 | 0.91 |
| TW/SW | 0.72 | 0.72 | 0.72 | 0.72 | 0.72 | 0.72 | 0.72 | 0.72 | 0.72 | 0.72 | 0.72 | 0.72 | 0.72 |
| LOW ROLLING RESISTANCE PERFORMANCE | 100 | 101 | 101 | 102 | 102 | 103 | 102 | 104 | 104 | 105 | 103 | 106 | 106 |
| RIDE COMFORT PERFORMANCE | 100 | 101 | 101 | 102 | 100 | 103 | 100 | 104 | 104 | 105 | 106 | 106 | 103 |

FIG. 5

TIRE WITH SPECIFIED PROFILE

TECHNICAL FIELD

The technology relates to a tire and more particularly to a tire that can provide improved low rolling resistance performance and ride comfort performance of the tire.

BACKGROUND ART

To reduce rolling resistance of a tire, recent tires have a wide tire ground contact width while adopting a flat tire outer surface profile. As a known tire adopting such a structure, a technology described in Japan Unexamined Patent Publication No. 2019-137327 A is known.

On the other hand, particularly in a tire for a passenger vehicle, there is a demand for improving ride comfort performance of the tire.

SUMMARY

The technology provides a tire that can provide improved low rolling resistance performance and ride comfort performance of the tire.

A tire according to an embodiment of the technology includes a pair of bead cores, a carcass layer extending between the pair of bead cores, a belt layer disposed on an outer side of the carcass layer in a tire radial direction, a tread rubber disposed on an outer side of the belt layer in the tire radial direction, a pair of sidewall rubbers disposed on an outer side of the carcass layer in a tire width direction, and a rim cushion rubber extending from an inner side in the tire radial direction to an outer side in the tire width direction of the pair of bead cores. A distance GT from the tire outer surface profile at a tire ground contact edge to a tire inner surface, a distance GC from the tire outer surface profile at a position of 70% of a tire cross-sectional height SH to the tire inner surface, and a distance GD from the tire outer surface profile at a tire maximum width position to the tire inner surface satisfy conditions $1.00 \le GC/GD \le 1.10$ and $3.00 \le GT/GC \le 4.00$.

In the tire according to an embodiment of the technology, (1) the ratio GC/GD within the range described above reduces a rubber volume from a tire maximum width position D to a buttress portion, reduces a longitudinal elastic modulus of the tire, and advantageously improves ride comfort performance of the tire. At the same time, (2) the lower limit of the ratio GT/GC described above ensures the rubber volume of the buttress portion and advantageously ensures the ride comfort performance of the tire. Moreover, the upper limit of the ratio GT/GC reduces heat generation in the buttress portion due to excessive rubber volume of the buttress portion and advantageously reduces the rolling resistance of the tire.

BRIEF DESCRIPTION OF DRAWINGS

FIG. 5 is a table showing results of performance tests of a tire according to an embodiment of the technology.

DETAILED DESCRIPTION

Embodiments of the technology will be described in detail below with reference to the drawings. Note that the embodiments do not limit the technology. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
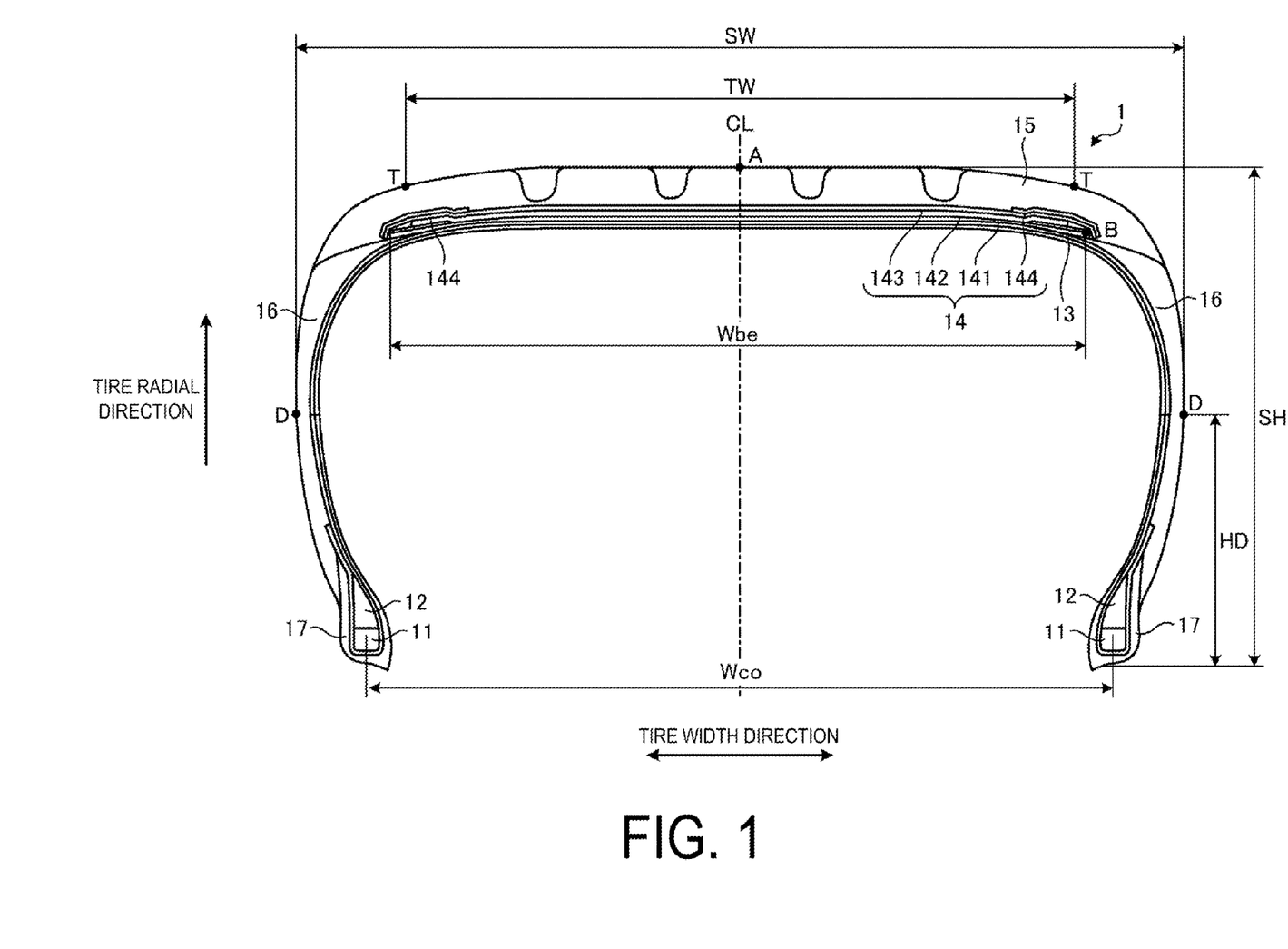
FIG. 1 is a cross-sectional view in a tire meridian direction illustrating a tire according to an embodiment of the technology.

FIG. 1 is a cross-sectional view in a tire meridian direction illustrating a tire according to an embodiment of the technology. The same drawing illustrates a cross-sectional view of a half region in a tire radial direction. In this embodiment, a pneumatic radial tire for passenger vehicles will be described as an example of a tire.

In the same drawing, a cross-section in the tire meridian direction is defined as a cross-section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA) The Japan Automobile Tyre Manufacturers Association, Inc.). Additionally, a tire width direction is defined as a direction parallel to the tire rotation axis, and the tire radial direction is defined as a direction perpendicular to the tire rotation axis. Additionally, point T is the tire ground contact edge, and point D is the tire maximum width position.

The tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are respectively disposed on an outer circumference of the pair of bead cores 11, 11 in the tire radial direction and reinforce the bead portions. Moreover, the rubber hardness of the bead filler is in the range of 65 or more and 99 or less.

Rubber hardness Hs is measured in accordance with JIS (Japanese Industrial Standard) K6253.

The carcass layer 13 has a single layer structure including one carcass ply or a multilayer structure including a plurality of carcass plies being layered, extends in a toroidal shape between the bead cores 11, 11 at the left and right, and constitutes the backbone of the tire. Additionally, both end portions of the carcass layer 13 are turned back toward outer sides in the tire width direction to wrap the bead cores 11 and the bead fillers 12, and are fixed. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

Note that in the configuration in FIG. 1, the carcass layer 13 includes a single layer structure formed of a single carcass ply. However, no such limitation is intended, and the carcass layer 13 may have a multilayer structure formed by layering a plurality of carcass plies (not illustrated).

The belt layer 14 is made of a plurality of belt plies 141 to 144 being layered and is disposed around an outer circumference of the carcass layer 13. The belt plies 141 to 144 include a pair of cross belts 141, 142, a belt cover 143, and a pair of belt edge covers 144.

The pair of cross belts 141, 142 are made by covering a plurality of belt cords made of steel or an organic fiber material with a coating rubber and performing a rolling process on the belt cords, and have a cord angle of 15 degrees or more and 55 degrees or less as an absolute value. Further, the pair of cross belts 141, 142 have cord angles (defined as inclination angles in longitudinal directions of the belt cords with respect to the tire circumferential direction) of mutually opposite signs and are layered such that the longitudinal directions of the belt cords intersect each other (so-called crossply structure). Furthermore, the pair of cross belts 141, 142 are disposed in a layered manner on an outer side in the tire radial direction of the carcass layer 13.

The belt cover 143 and the belt edge covers 144 are made by covering a plurality of belt cover cords made of steel or an organic fiber material with coating rubber, and have a cord angle 0 degree or more and 10 degrees or less as an absolute value. Additionally, for example, a strip material is formed of one or a plurality of belt cover cords covered with coating rubber, and the belt cover 143 and the belt edge covers 144 are made by winding this strip material multiple times and in a spiral-like manner in the tire circumferential direction around outer circumferential surfaces of the cross belts 141, 142. Additionally, the belt cover 143 is disposed completely covering the cross belts 141, 142, and the pair of belt edge covers 144 are disposed covering the left and right edge portions of the cross belts 141, 142 from the outer side in the tire radial direction.

The tread rubber 15 is disposed in the outer circumferences in the tire radial direction of the carcass layer 13 and the belt layer 14 and constitutes a tread portion of the tire. Moreover, the tread rubber 15 is formed by laminating a cap tread and an undertread (reference numerals omitted in the drawing). The cap tread is made of a rubber material that is excellent in ground contact characteristics and weather resistance, and the cap tread is exposed in a tread surface all across a tire ground contact surface, and constitutes an outer surface of the tread portion. Moreover, the rubber hardness of the cap tread is in the range of 60 or more and 80 or less. The undertread is made of a rubber material having a higher heat resistance than the cap rubber, and is sandwiched between the cap tread and the belt layer to constitute the base portion of the tread rubber. Moreover, the rubber hardness of the undertread is in the range of 50 or more and 65 or less.

The pair of sidewall rubbers 16, 16 are disposed on an outer side in the tire width direction of the carcass layer 13 and constitute sidewall portions of left and right, respectively. For example, in the configuration of FIG. 1, the end portion of the sidewall rubber 16 on the outer side in the tire radial direction is disposed in the lower layer of the tread rubber 15 and is sandwiched between the belt layer 14 and the carcass layer 13. However, no such limitation is intended, and the end portion of the sidewall rubber 16 on the outer side in the tire radial direction may be disposed in an outer layer of the tread rubber 15 and exposed in a buttress portion of the tire (not illustrated). Moreover, the rubber hardness of the sidewall rubber 16 is in the range of 40 or more and 70 or less. The loss tangent tan δ of the sidewall rubber 16 is in the range of 0.20 or less.

The loss tangent tan δ is measured by using a viscoelasticity spectrometer available from Toyo Seiki Seisaku-sho Ltd. at a temperature of 60° C., a shear strain of 10%, an amplitude of ±0.5%, and a frequency of 20 Hz.

The pair of rim cushion rubbers 17, 17 extend from an inner side in the tire radial direction of the bead cores 11, 11 of left and right and turned back portions of the carcass layer 13 toward the outer side in the tire width direction, and constitute rim fitting surfaces of the bead portions. For example, in the configuration of FIG. 1, an end portion on the outer side in the tire radial direction of the rim cushion rubber 17 is inserted to a lower layer of the sidewall rubber 16, and is disposed being sandwiched between the sidewall rubber 16 and the carcass layer 13. The rubber hardness of the rim cushion rubber 17 is in the range of 50 or more and 80 or less. Moreover, the elongation at break of the rim cushion rubber 17 is in the range of 150% to 450%.

In FIG. 1, the height HD of the tire maximum width position D with respect to the tire cross-sectional height SH has a relationship $0.50 \leq HD/SH \leq 0.60$ and preferably has a relationship $0.52 \leq HD/SH \leq 0.56$. Accordingly, the tire maximum width position D is disposed on the outer side in the tire radial direction from the central portion of the measurement point of the tire cross-sectional height SH.

The tire maximum width position D is defined as the maximum width position of the tire cross-sectional width SW defined by JATMA.

The height HD of the tire maximum width position D is the distance in the tire radial direction from the measurement point of the tire inner diameter to the tire maximum width position D, and is measured when the tire is mounted on a specified rim and inflated to a specified internal pressure, and in an unloaded state.

The tire cross-sectional width SW is measured as a linear distance between sidewalls (excluding patterns, letters, and the like on the tire side surface) when the tire is mounted on a specified rim, inflated to a specified internal pressure, and in an unloaded state. More specifically, the tire cross-sectional width SW is measured using a point on the tire outer surface profile of the sidewall portion of the tire as a measurement point.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

In addition, the tire cross-sectional height SH with respect to the tire cross-sectional width SW has a relationship $0.55 \leq SH/SW \leq 0.65$ and preferably has a relationship $0.58 \leq SH/SW \leq 0.60$. At the same time, the tire ground contact width TW with respect to the tire cross-sectional width SW has a relationship $0.60 \leq TW/SW \leq 0.90$ and preferably has a relationship 0.70≤TW/SW≤0.72. In such a configuration, the rolling resistance of the tire 1 is reduced because the tire 1 has a high aspect ratio SH/SW and a wide ground contact width ratio TW/SW compared to an average passenger vehicle tire.

The tire cross-sectional height SH is a distance equal to half of a difference between a tire outer diameter and a rim diameter, and is measured when the tire is mounted on a specified rim, inflated to a specified internal pressure, and in an unloaded state.

The tire ground contact width TW is measured as a maximum linear distance in a tire axial direction in a contact surface between the tire and a flat plate when the tire is mounted on a specified rim, inflated to a specified internal pressure, placed perpendicular to the flat plate in a static state, and subjected to a load corresponding to a specified load.

In addition, the radius (dimension symbols omitted in the drawing) of the tire outer surface profile in the tire ground contact region ranges from 600 mm to 1700 mm and preferably ranges from 800 mm to 1500 mm. The lower limit described above ensures the ground contact area of the tire 1, and the upper limit described above ensures the ground contact characteristics of the center region of the tread portion, thus ensuring the braking performance of the tire.

The tire ground contact region is defined as the region between the left and right tire ground contact edges T.

In addition, the tire cross-sectional width SW with respect to the distance Wco between the pair of bead cores 11, 11 has a relationship 1.20≤SW/Wco≤1.40 and preferably has a relationship 1.25≤SW/Wco≤1.35. Accordingly, the tire cross-sectional width SW is set narrower than the distance Wco between the bead cores 11, 11 compared to an average passenger vehicle tire. In such a configuration, the tire side portion has a flat wall surface, thus reducing the longitudinal elastic constant of the tire and improving the ride comfort performance of the tire.

The distance Wco between the pair of bead cores 11, 11 is a distance between centers of gravity of the bead cores 11, 11 in a cross-sectional view in the tire meridian direction, and is measured when the tire is mounted on a specified rim, inflated to a specified internal pressure, and in an unloaded state.

The tire ground contact width TW with respect to the distance Wco between the pair of bead cores 11, 11 has a relationship 0.90≤TW/Wco<1.00 and preferably has a relationship 0.95≤TW/Wco≤0.98. Accordingly, the tire ground contact edge T is closer to the tire equatorial plane CL than the center of gravity of the bead core 11. The lower limit ensures the tire ground contact width TW and ensures the running performance of the tire. In addition, the upper limit suppresses deterioration of tire ride comfort performance caused by an excessively large tire ground contact width TW.

A tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

In FIG. 1, the width Wbe of the wider cross belt 141 of the pair of cross belts 141, 142 with respect to the tire ground contact width TW has a relationship 1.00≤Wbe/TW≤1.10 or has a relationship 1.05≤Wbe/TW≤1.09. Accordingly, the ends of the wider cross belt 141 are located on the outer side than the tire ground contact width TW in the tire width direction.

The width Wbe of the cross belts 141, 142 is the distance in the tire width direction between the left and right end points B of the cross belts 141, 142 (more specifically, the centers of gravity of the outermost belt cords in the tire width direction), and is measured when the tire is mounted on a specified rim and inflated to a specified internal pressure, and in an unloaded state.

Region on Outer Side in Tire Radial Direction

Figure 2:
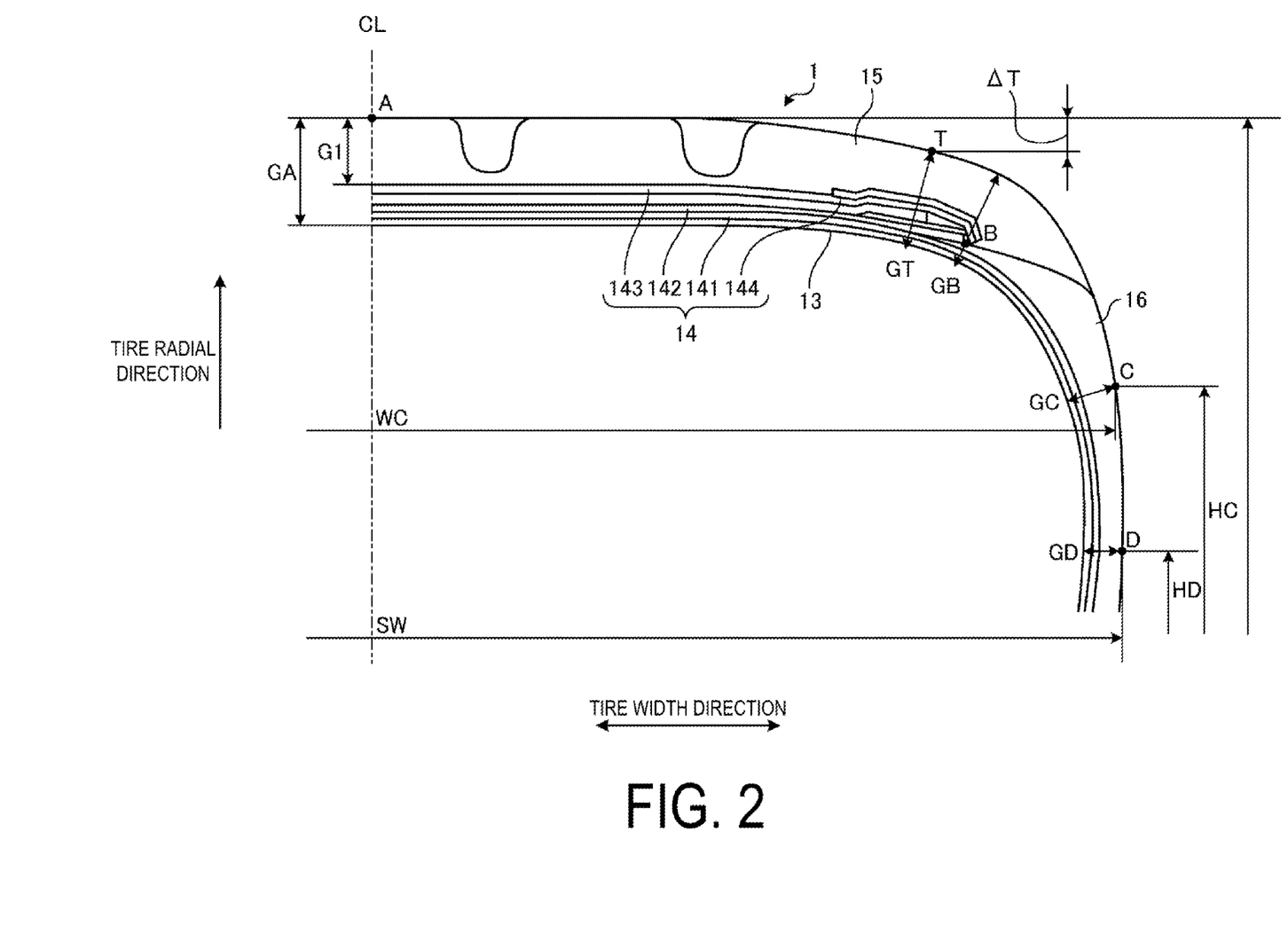
FIG. 2 is an enlarged view illustrating a region on an outer side in a tire radial direction of the tire illustrated in FIG. 1.

FIG. 2 is an enlarged view illustrating a region on the outer side in the tire radial direction of the tire illustrated in FIG. 1.

In FIG. 2, when the tire is mounted on a specified rim and inflated to a specified internal pressure, and in an unloaded state, an intersection point A between the tire equatorial plane CL and the tire outer surface profile and a point C on the tire outer surface profile at a position of 70% of the tire cross-sectional height SH from the measurement point of the tire inner diameter are defined.

The tire inner diameter measurement point corresponds to the rim diameter measurement point specified in JATMA.

At this time, in FIG. 2, the distance GC from the tire outer surface profile at the position C of 70% of the tire cross-sectional height SH to the tire inner surface and the distance GD from the tire outer surface profile at the tire maximum width position D to the tire inner surface have a relationship 1.00≤GC/GD≤1.20 and preferably has a relationship 1.00≤GC/GD≤1.10. Accordingly, the total gauge (distance GC) at the position of 70% of the tire cross-sectional height SH is set to be substantially equal to the total gauge (distance GD) at the tire maximum width position D. This reduces the longitudinal elastic modulus of the tire and improves the ride comfort performance of the tire. For example, in the configuration of FIG. 2, since the buttress portion of the tire 1 has a thin structure, the ratio GC/GD is achieved. The distance GD is in the range of 2.0 mm≤GD≤5.0 mm and preferably in the range of 3.0 mm≤GD≤4.0 mm.

The distance from the tire outer surface profile to the tire inner surface is measured as the length of a perpendicular line drawn from a point on the tire outer surface profile to the tire inner surface.

In FIG. 2, the distance GT from the tire outer surface profile at the tire ground contact edge T to the tire inner surface and the distance GC from the tire outer surface profile at the position C of 70% of the tire cross-sectional height SH to the tire inner surface have a relation of 3.00≤GT/GC≤4.00, preferably has a relationship 3.10≤GT/GC≤3.50, and more preferably has a relationship 3.15≤GT/GC≤3.25. The lower limit ensures the rubber volume of the buttress portion and ensures the ride comfort performance of the tire. Moreover, the upper limit reduces heat generation in the buttress portion due to excessive rubber volume of the buttress portion and reduces the rolling resistance of the tire.

The distance GA from the tire outer surface profile to the tire inner surface at the tire equatorial plane CL with respect to the distance GT from the tire outer surface profile at the tire ground contact edge T to the tire inner surface has a relationship 1.00≤GA/GT≤1.10 and preferably has a relationship 1.02≤GA/GT≤1.08. Accordingly, the total gauge (distance GA) at the tire equatorial plane CL is set to be substantially equal to the total gauge (distance GT) at the tire ground contact edge T. With such a configuration, since the total gauge in the tire ground contact region is made uniform, heat generation during tire rolling is suppressed, and the rolling resistance of the tire is reduced. For example, in the configuration of FIG. 2, since the shoulder portion of the tire 1 has a rounded shape, the ratio GA/GT is realized.

In FIG. 2, the gauge G1 of the tread rubber 15 on the tire equatorial plane CL with respect to the distance GA on the tire equatorial plane CL has a relationship $0.50 \leq G1/GA \leq 0.70$ and preferably has a relationship $0.60 \leq G1/GA \leq 0.65$. The lower limit ensures the gauge G1 of the tread rubber 15 and ensures the ride comfort performance of the tire. In addition, the upper limit reduces the hysteresis loss caused by the gauge G1 of the tread rubber 15 being excessively large and suppress deterioration of the rolling resistance of the tire.

When viewed in a cross-sectional view in the tire meridian direction, a gauge of the tread rubber 15 is measured as the length of a perpendicular line drawn from a tire outer surface profile to a belt cord surface of the outermost layer of the belt layer. The belt cord surface is defined as a surface connecting the end portions that are on an outer side in the tire radial direction of the plurality of belt cords forming the belt ply.

In FIG. 2, the distance GB from the tire outer surface profile at the end point B of the wide cross belt 141 to the tire inner surface with respect to the distance GT at the tire ground contact edge T and the distance GC at the position C of 70% of the tire cross-sectional height SH has a relationship $GC \leq GB \leq GT$. Moreover, the total gauge of the buttress portion of the tire 1 monotonically preferably decreases from the position C of 70% of the tire cross-sectional height SH toward the tire ground contact edge T. This optimizes the distance GB at the end point B of the wide cross belt 141 and ensures the ride comfort performance of the tire.

In FIG. 2, the shoulder drop amount ΔT of the tire outer surface profile at the tire ground contact edge T with respect to the tire ground contact width TW has a relationship $0 < \Delta T/(TW/2) \leq 0.06$, or has a relationship $0 < \Delta T/(TW/2) \leq 0.05$, and preferably has a relationship $0.03 \leq \Delta T/(TW/2) \leq 0.04$. The lower limit prevents the tire outer surface profile from becoming a so-called reverse R shape and ensures the ground contact characteristics of the tire. In addition, the upper limit ensures a flat shape of the tire ground contact region and appropriately reduces the rolling resistance of the tire.

The shoulder drop amount ΔT of the tire outer surface profile is the distance in the tire radial direction from the intersection point A between the tire equatorial plane CL and the tire outer surface profile in a cross-sectional view in the tire meridian direction to the tire ground contact edge T, and is measured when the tire is mounted on a specified rim and inflated to a specified internal pressure, and in an unloaded state.

The width WC of the tire outer surface profile at the position C of 70% of the tire cross-sectional height SH with respect to the tire cross-sectional width SW has a relationship $0.90 \leq WC/SW \leq 1.00$ and preferably has a relationship $0.95 \leq WC/SW \leq 1.00$. Accordingly, the position C of 70% of the tire cross-sectional height SH is substantially at the same position as the tire maximum width position D in the tire width direction. In such a configuration, since the tire side portion has a flat wall surface (that is, substantially parallel to the tire radial direction) near the tire maximum width position D, the longitudinal elastic constant of the tire is reduced, and the ride comfort performance of the tire is improved.

The width of the tread profile is the width of the tire outer surface profile in the tire width direction at a predetermined position, and is measured in a cross-sectional view in the tire meridian direction when the tire is mounted on a specified rim and inflated to a specified internal pressure, and in an unloaded state.

Region on Inner Side in Tire Radial Direction

Figure 3:
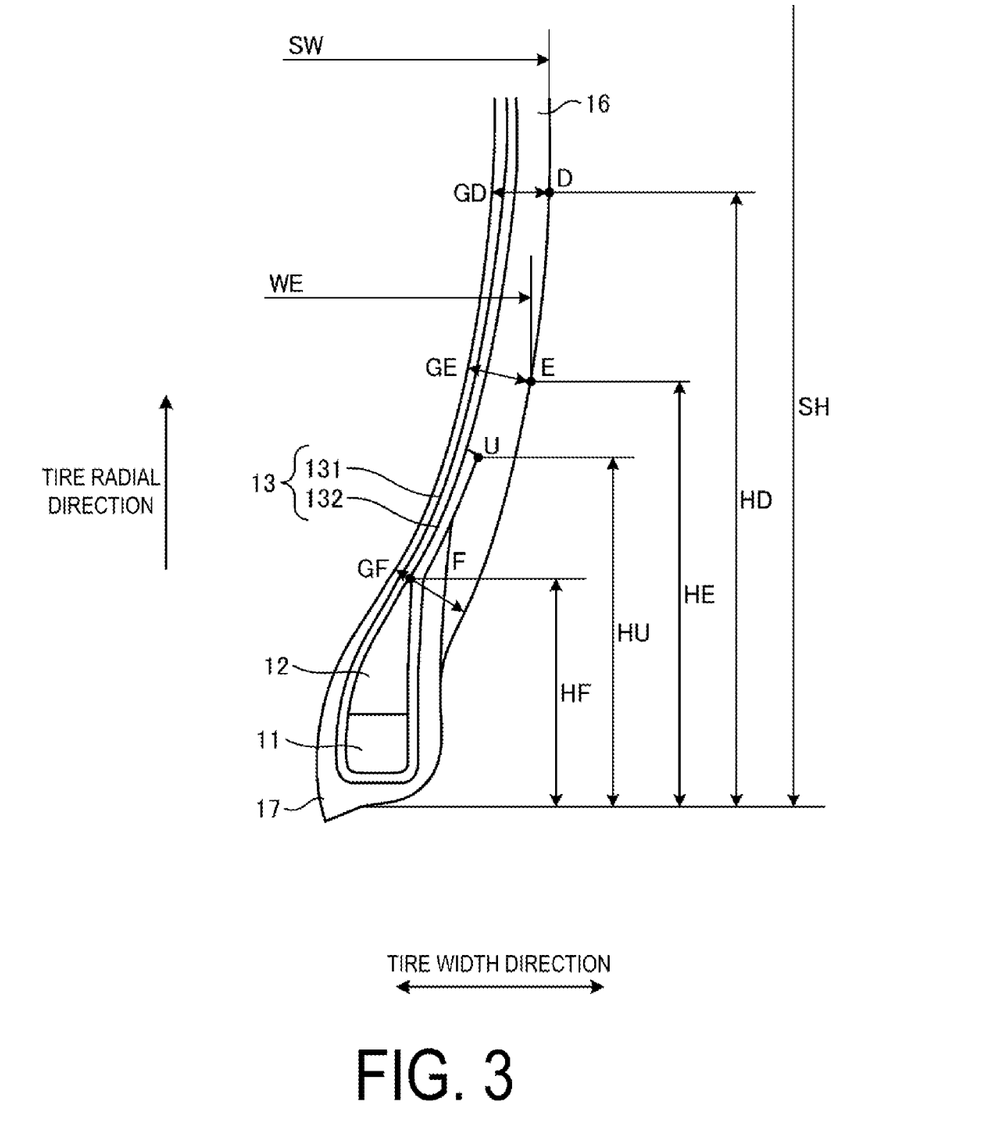
FIG. 3 is an enlarged view illustrating a region on an inner side in the tire radial direction of the tire illustrated in FIG. 1.

FIG. 3 is an enlarged view illustrating a region on the inner side in the tire radial direction of the tire illustrated in FIG. 1.

In FIG. 3, in a cross-sectional view in the tire meridian direction when the tire is mounted on a specified rim and inflated to a specified internal pressure, and in an unloaded state, a point E on the tire outer surface profile at the position of 30% of the tire cross-sectional height SH, a self-contact starting point F of the turned back portion 132 of the carcass layer 13 and a point U of the terminating position of the turned back portion 132 of the carcass layer 13 are defined.

The body portion 131 of the carcass layer 13 is defined as the portion of the carcass layer 13 extending from the bead core 11 to the inner side in the tire width direction, and the turned back portion 132 of the carcass layer 13 is defined as the portion of the carcass layer 13 extending from the bead core 11 to the outer side in the tire width direction. The self-contact starting point F of the turned back portion 132 of the carcass layer 13 is defined as the innermost point in the tire radial direction of the contact region between the body portion 131 of the carcass layer 13 and the turned back portion 132. A point U at the terminating position of the turned back portion 132 of the carcass layer 13 is defined as the outermost point of the turned back portion 132 in the tire radial direction.

At this time, the distance GE from the tire outer surface profile at the position E of 30% of the tire cross-sectional height SH to the tire inner surface and the distance GD from the tire outer surface profile at the tire maximum width position D to the tire inner surface have a relationship GE/GD. In the configuration of FIG. 2, the sidewall rubber 16 has a thin structure in the region from the tire maximum width position D to the bead portion.

In FIG. 3, the distance GF from the tire outer surface profile at the self-contact starting point F of the turned back portion 132 of the carcass layer 13 to the tire inner surface and the distance GD from the tire outer surface profile at the tire maximum width position D to the tire inner surface have a relationship $1.00 \leq GF/GD \leq 1.40$ and preferably has a relationship $1.10 \leq GF/GD \leq 1.30$. In the configuration of FIG. 3, the distance GF at the self-contact starting point F of the turned back portion 132 with respect to the distance GE at the position E of 30% of the tire cross-sectional height SH has a relationship $GE \leq GF$. The upper limit of the ratio GF/GD reduces heat generation in the bead portion due to excessive rubber volume of the bead portion, thereby reducing the rolling resistance of the tire. For example, in the configuration of FIG. 2, the ratio GF/GD is realized since the total gauge of the tire side portion monotonously increases from the tire maximum width position D toward the inner side in the tire radial direction.

In FIG. 3, the height HU at the terminating position U of the turned back portion 132 of the carcass layer 13 with respect to the tire cross-sectional height SH has a relationship $0.10 \leq HU/SH \leq 0.40$ and preferably has a relationship $0.20 \leq HU/SH \leq 0.30$.

The height HU at the terminating position U of the turned back portion 132 is the distance in the tire radial direction from the measurement point of the tire inner diameter to the terminating position U of the turned back portion 132 of the carcass layer 13 and is measured when the tire is mounted on a specified rim and inflated to a specified internal pressure, and in an unloaded state.

In FIG. 3, the height HF of the contact starting point F between the body portion 131 of the carcass layer 13 and the turned back portion 132 with respect to the height HU at the terminating position U of the turned back portion 132 of the carcass layer 13 and the tire cross-sectional height SH has a relationship $0.15 \leq (HU-HF)/SH$ and $HF/SH \leq 0.30$. The difference HU-HF is preferably in the range of $15.0 \text{ mm} \leq HU-HF$. This ensures the self-contact length (HU-HF) of the carcass layer 13 and ensures the strength of the bead portion. The height HF of the self-contact starting point F of the carcass layer 13 is set to be low, a flexible region of the side portion of the tire 1 is ensured. Although the lower limit of the ratio HF/SH is not particularly limited, for example, in a configuration including the bead filler 12 as illustrated in FIG. 3, the measurement point of the height HF is located near the outer end portion in the radial direction of the bead filler 12. In addition, in a structure in which the bead filler 12 is omitted (a so-called filler-less structure, see FIG. 4 described later), the measurement point of the height HF is located near the front surface on the outer side in the radial direction of the bead core 11.

In FIG. 3, the width WE of the tire outer surface profile at the position E of 30% of the tire cross-sectional height SH with respect to the tire cross-sectional width SW has a relationship $0.90 \leq WE/SW \leq 1.00$ and preferably has a relationship $0.95 \leq WE/SW \leq 1.00$. Accordingly, the position E of 30% of the tire cross-sectional height SH is substantially at the same position as the tire maximum width position D in the tire width direction. In such a configuration, since the tire side portion has a flat wall surface (that is, substantially parallel to the tire radial direction) near the tire maximum width position D, the longitudinal elastic constant of the tire is reduced, and the ride comfort performance of the tire is improved.

MODIFIED EXAMPLES

Figure 4:
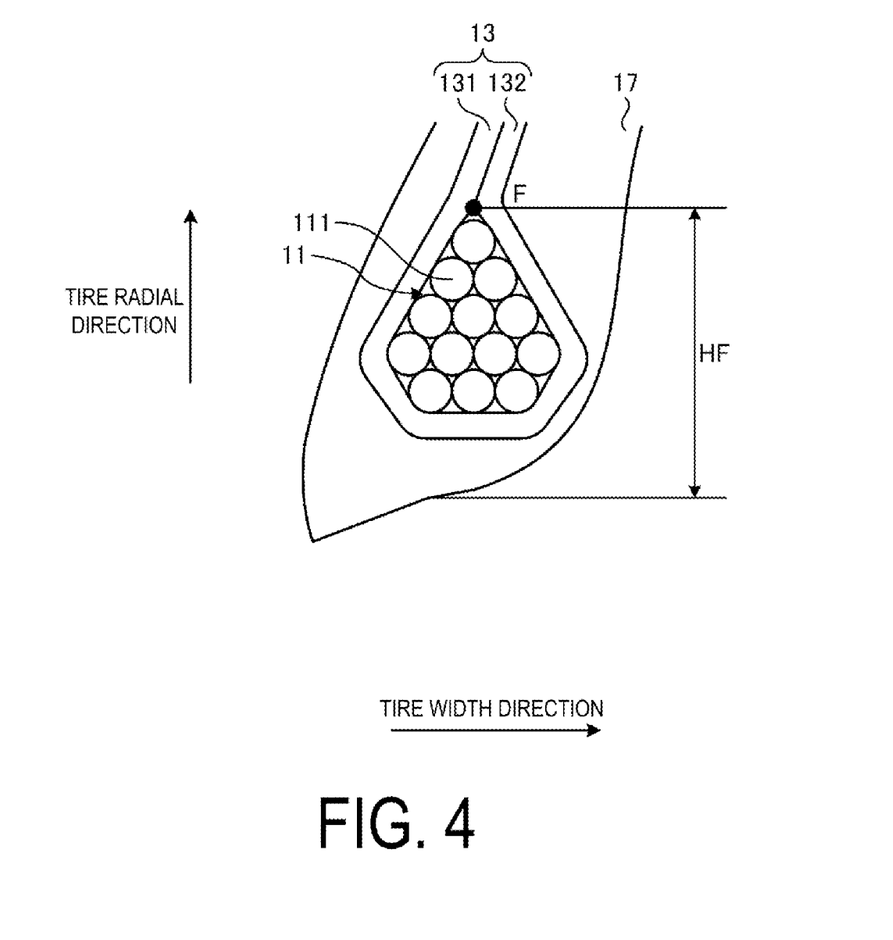
FIG. 4 is an explanatory diagram illustrating a modified example of the tire illustrated in FIG. 1.

FIG. 4 is an explanatory diagram illustrating a modified example of the tire illustrated in FIG. 1. FIG. 4 shows an enlarged view of the bead portion of the tire 1. In the same drawing, constituents that are the same as the constituents illustrated in FIG. 1 are denoted by the same reference signs, and explanations thereof are omitted.

In the configuration of FIG. 1, the tire 1 has a bead filler 12 and the bead core 11 has a rectangular shape.

However, no such limitation is intended, and the bead filler 12 may be omitted as illustrated in FIG. 4. Alternatively, very small bead fillers 12 may be disposed (not illustrated). This makes the tire lighter. For example, in the configuration of FIG. 4, the bead filler 12 is omitted, and the turned back portion 132 of the carcass layer 13 wraps only the bead core 11 and is turned back and is in self-contact with the body portion 131. For this reason, the self-contact starting point F of the turned back portion 132 of the carcass layer 13 is near the bead core 11 and has a very small height HF.

Moreover, in the structure of FIG. 4, the bead core 11 has a wedge shape that projects toward the outer side in the tire radial direction. Specifically, in a radial cross-sectional view of the bead core 11, the layer in which the number of arranged bead wire cross-sections is largest (the second layer from the innermost layer in FIG. 4) is defined as the maximum arrangement layer. At this time, the number of layers of the wire cross-sections on the outer side of the maximum arrangement layer in the tire radial direction (three layers in FIG. 4) is larger than the number of layers of the wire cross-sections on the inner side of the maximum arrangement layer in the tire radial direction (one layer in FIG. 4). In addition, the number of wire cross-sections arranged in each layer on the outer side of the maximum arrangement layer in the tire radial direction monotonically decreases from the maximum arrangement layer toward the outer side in the tire radial direction. Moreover, the number of layers of the wire cross-sections is preferably in the range of 4 or more and 6 or less. In addition, preferably, the number of wire cross-sections arranged in the innermost layer in the tire radial direction of the wire arrangement structure is 3 or 4 (three in FIG. 4) and is equal to or smaller than the number of wire cross-sections arranged in the maximum arrangement layer. In addition, preferably, the number of wire cross-sections arranged in the maximum arrangement layer of the wire arrangement structure is 4 or 5 (four in FIG. 4), and the number of wire cross-sections arranged in the outermost layer in the tire radial direction is 1 or 2 (one in FIG. 4).

Moreover, the wire cross-sections are preferably arranged in a closest packed structure in a region on the outer side in the tire radial direction from the maximum arrangement layer. The closest packed structure refers to a state in which the centers of three adjacent wire cross-sections are arranged forming a substantially equilateral triangle when viewed in a cross-section in the tire meridian direction. Such a closest packed structure increases the arrangement density of the wire cross-sections of the bead cores 11 and improves the core collapse resistance of the bead cores 11 compared to a lattice arrangement structure in which the rows of wire cross-sections are orthogonal to each other. In the closest packed state, not all pairs of adjacent wire cross-sections need to be in contact with each other, and some pairs may be disposed with minute gaps (not illustrated).

In the manufacturing process of the bead core 11, for example, a core forming jig (not illustrated) is used, and one or more bead wires 111 are wound around the core forming jig in a predetermined wire arrangement structure to obtain an unvulcanized bead core 11. Then, the formed bead core 11 is pre-vulcanized before a green tire is vulcanized.

Effect

As described above, the tire 1 includes a pair of bead cores 11, 11, a carcass layer 13 extending between the pair of bead cores 11, 11, a belt layer 14 disposed on the outer side of the carcass layer 13 in the tire radial direction, a tread rubber 15 disposed on the outer side of the belt layer 14 in the tire radial direction, a pair of sidewall rubbers 16, 16 disposed on the outer side of the carcass layer 13 in the tire width direction, and a rim cushion rubber 17 extending from an inner side in the tire radial direction to an outer side in the tire width direction of the pair of bead cores 11, 11 (see FIG. 1). In addition, the distance GT from the tire outer surface profile at the tire ground contact edge T to the tire inner surface, the distance GC from the tire outer surface profile at the position C of 70% of the tire cross-sectional height SH to the tire inner surface, and the distance GD from the tire outer surface profile at the tire maximum width position D to the tire inner surface satisfy the conditions $1.00 \leq GC/GD \leq 1.10$ and $3.00 \leq GT/GC \leq 4.00$ (see FIG. 2).

In such a configuration, (1) the ratio GC/GD within the range reduces the rubber volume from the tire maximum width position D to the buttress portion, reduces the longitudinal elastic modulus of the tire, and advantageously improves the ride comfort performance of the tire. At the same time, (2) the lower limit of the ratio GT/GC ensures the rubber volume of the buttress portion and advantageously ensures the ride comfort performance of the tire. Moreover, the upper limit of the ratio GT/GC reduces heat generation in the buttress portion due to excessive rubber volume of the buttress portion and advantageously reduces the rolling resistance of the tire.

In this tire 1, the distance GA from the tire outer surface profile on the tire equatorial plane CL to the tire inner surface with respect to the distance GT at the tire ground contact edge T has a relationship $1.00 \leq GA/GT \leq 1.10$ (FIG. 2). Such a configuration makes the total gauge in the tire ground contact region uniform, thus reducing heat generation during tire rolling, and advantageously reduces the rolling resistance of the tire.

In the tire 1, the gauge G1 of the tread rubber 15 on the tire equatorial plane CL with respect to the distance GA on the tire equatorial plane CL has a relationship $0.50 \leq GVGA \leq 0.70$ (see FIG. 2). The lower limit ensures the gauge G1 of the tread rubber 15 and advantageously ensures the ride comfort performance of the tire. In addition, the upper limit reduces the hysteresis loss caused by the gauge G1 of the tread rubber 15 being excessively large and advantageously suppresses deterioration of the rolling resistance of the tire.

In this tire 1, the distance GD at the tire maximum width position D is in the range of $2.0 \text{ mm} \leq GD \leq 5.0 \text{ mm}$ (see FIG. 2). This advantageously optimizes the total gauge at the tire maximum width position D.

In addition, in this tire 1, the belt layer 14 includes a pair of cross belts 141, 142, and the distance GB from the tire outer surface profile at the end point B of the wider cross belt 141 of the pair of cross belts 141, 142 to the tire inner surface with respect to the distance GT at the tire ground contact edge and the distance GC at the position of 70% of the tire cross-sectional height SH has a relationship $GC \leq GB \leq GT$ (see FIG. 2). This optimizes the distance GB at the end point B of the wide cross belt 141 and advantageously ensures the ride comfort performance of the tire.

In this tire 1, the distance GE from the tire outer surface profile at the position of 30% of the tire cross-sectional height SH to the tire inner surface with respect to the distance GD at the tire maximum width position D has a relationship GE/GD which reduces the longitudinal elasticity modulus of the tire and advantageously improves the ride comfort performance of the tire.

In this tire 1, the radius of the tire outer surface profile in the tire ground contact region is in the range of 600 mm or more and 1700 mm or less. The lower limit advantageously ensures the ground contact area of the tire 1. In addition, the upper limit ensures the ground contact characteristics of the center region of the tread portion and advantageously ensures the braking performance of the tire.

In addition, the shoulder drop amount $\Delta T$ (see FIG. 2) of the tire outer surface profile at the tire ground contact edge T with respect to the tire ground contact width TW has a relationship $0 \leq \Delta T/(TW/2) \leq 0.05$ (see FIG. 1). The lower limit prevents the tire outer surface profile from having a so-called reverse R shape and advantageously ensures the ground contact characteristics of the tire. In addition, the upper limit ensures a flat shape of the tire ground contact region and advantageously reduces the rolling resistance of the tire appropriately.

In this tire 1, the width WC of the tire outer surface profile at the position of 70% of the tire cross-sectional height SH with respect to the tire cross-sectional width SW has a relationship $0.90 \leq WC/SW \leq 1.00$ (see FIG. 2). In such a configuration, the tire side portion has a flat wall surface (that is, substantially parallel to the tire radial direction) near the tire maximum width position D, thus reducing the longitudinal elastic constant of the tire and advantageously improving the ride comfort performance of the tire.

In the tire 1, the belt layer 14 has a pair of cross belts 141, 142, and the width Wbe of the wider cross belt 141 of the pair of cross belts 141, 142 with respect to the tire ground contact width TW has a relationship $1.00 \leq Wbe/TW \leq 1.10$ (see FIG. 1). The lower limit ensures the width Wbe of the wide cross belt 141, reduces the hysteresis loss during tire rolling, and advantageously suppresses deterioration of tire rolling resistance. Moreover, the upper limit reduces an increase in tire weight due to an excessive width Wbe of the cross belt 141 and advantageously suppresses deterioration of the rolling resistance of the tire.

In this tire 1, the height HD of the tire maximum width position D with respect to the tire cross-sectional height SH has a relationship $0.50 \leq HD/SH \leq 0.60$ (see FIG. 1). In such a configuration, the tire maximum width position D is disposed on the outer side in the tire radial direction from the center of the tire cross-sectional height SH, thus reducing the longitudinal elastic constant of the tire and advantageously reducing the rolling resistance of the tire. In addition, the ride comfort performance of the tire is advantageously improved in an inflated state with an internal pressure higher than the specified internal pressure.

In this tire 1, the tire cross-sectional height SH and the tire ground contact width TW with respect to the tire cross-sectional width SW satisfy the conditions $0.55 \leq SH/SW \leq 0.65$ and $0.60 \leq TW/SW \leq 0.90$ (see FIG. 1). In such a configuration, the tire 1 has a high aspect ratio SH/SW and a wide ground contact width ratio TW/SW compared to an average passenger vehicle tire, thus advantageously reducing the rolling resistance of the tire 1.

EXAMPLE

FIG. 5 is a table indicating the results of performance tests of tires according to an embodiment of the technology.

In the performance tests, (1) low rolling resistance performance and (2) ride comfort performance were evaluated for a plurality of types of test tires. A test tire with a tire size of 205/60R16 92V was mounted on a rim with a rim size of 16 6.0 J, and an internal pressure of 250 [kPa] and a load equivalent to that of two passengers were applied to the test tire.

(1) In the evaluation of low rolling resistance performance, a drum testing machine with a drum diameter of 1707 mm is used, and the rolling resistance coefficients of the test tires are calculated under conditions of a speed of 80 km/h in accordance with IS 028580. Results of the evaluation are expressed as index values and evaluated with Conventional Example being assigned as the reference (100). In this evaluation, larger values are preferable.

(2) In the evaluation of ride comfort performance, a test vehicle, which is a passenger vehicle equipped with test tires on all wheels, travels on a dry road surface of a test course, and a specialized test driver performs feeling evaluation on hardness in ride comfort and vibration damping. Results of the evaluation are expressed as index values and evaluated with Conventional Example being assigned as the reference of 100. In this evaluation, larger values are preferable.

The test tires of Examples have the configuration of FIGS. 1 to 3. The tire cross-sectional width SW defined by the tire outer surface profile is 220 mm, and the tire cross-sectional height SH is 125 mm. The distance GD at the tire maximum width position D is 3.5 mm.

In the test tire of the conventional example, the total gauge (distances GD, GC, and GT) from the tire maximum width position D to the tire ground contact edge T is set to be relatively thick as compared to the test tire of Example 1.

As can be seen from the test results, the test tires of Examples provide improved low rolling resistance performance and ride comfort performance of the tires.

The invention claimed is:

1. A tire, comprising:
a pair of bead cores;
a carcass layer extending between the pair of bead cores;
a belt layer disposed on an outer side of the carcass layer in a tire radial direction;
a tread rubber disposed on an outer side of the belt layer in the tire radial direction, the tread rubber having a ground contact width TW between a pair of tread ground contact edges;
a pair of sidewall rubbers, each of the sidewall rubbers being disposed on a respective outer side of the carcass layer in a tire width direction; and
a rim cushion rubber extending from an inner side in the tire radial direction to an outer side in the tire width direction of each of the pair of bead cores,
a distance GT from a tire outer surface profile at each tread ground contact edge to a tire inner surface, a distance GC from the tire outer surface profile at each position of 70% of a tire cross-sectional height SH to the tire inner surface, and a distance GD from the tire outer surface profile at each tire maximum width position to the tire inner surface satisfying conditions $1.00 \leq GC/GD \leq 1.10$ and $3.00 \leq GT/GC \leq 4.00$.

2. The tire according to claim 1, wherein
a distance GA from the tire outer surface profile at a tire equatorial plane to the tire inner surface with respect to the distance GT has a relationship $1.00 \leq GA/GT \leq 1.10$.

3. The tire according to claim 1, wherein
the belt layer is made of at least one ply of cords covered with coating rubber, each belt ply having a belt cord surface, and
a gauge G1 of the tread rubber at a tire equatorial plane from the tire outer surface profile to the belt cord surface of the radially outermost belt ply with respect to a distance GA from the tire outer surface profile at the tire equatorial plane to the tire inner surface has a relationship $0.50 \leq G1/GA \leq 0.70$.

4. The tire according to claim 3, wherein
the distance GD is in a range of $2.0 \text{ mm} \leq GD \leq 5.0 \text{ mm}$.

5. The tire according to claim 4, wherein
The at least one ply of cords covered with coating rubber forming the belt layer includes a pair of cross belts, each cross belt having a pair of end points located at the centers of gravity of the outermost belt cords in the tire width direction, and
a distance GB from the tire outer surface profile to the tire inner surface at each end point of a wider cross belt of the pair of cross belts with respect to the distance GT and the distance GC has a relationship $GC \leq GB \leq GT$.

6. The tire according to claim 5, wherein
a shoulder drop amount ΔT of the tire outer surface profile at each tread ground contact edge with respect to the tread ground contact width TW has a relationship $0 < \Delta T/(TW/2) \leq 0.05$.

7. The tire according to claim 6, wherein
a width WC of the tire outer surface profile at the position of 70% of the tire cross-sectional height SH with respect to a tire cross-sectional width SW between the two maximum width positions has a relationship $0.90 \leq WC/SW \leq 1.00$.

8. The tire according to claim 7, wherein
a width Wbe between the end points of the wider cross belt of the pair of cross belts with respect to the tread ground contact width TW has a relationship $1.00 \leq Wbe/TW \leq 1.10$.

9. The tire according to claim 8, wherein
a height HD of each tire maximum width position with respect to the tire cross-sectional height SH has a relationship $0.50 \leq HD/SH \leq 0.60$; and
the tire cross-sectional height SH and the tread ground contact width TW with respect to the tire cross-sectional width SW between the two maximum width positions satisfy conditions $0.55 \leq SH/SW \leq 0.65$ and $0.60 \leq TW/SW \leq 0.90$.

10. The tire according to claim 1, wherein
the distance GD is in a range of $2.0 \text{ mm} \leq GD \leq 5.0 \text{ mm}$.

11. The tire according to claim 1, wherein
the belt layer includes a pair of cross belts, each cross belt being made of a ply of cords covered with coating rubber and having a pair of end points located at the centers of gravity of the outermost belt cords in the tire width direction, and
a distance GB from the tire outer surface profile to the tire inner surface at each end point of a wider cross belt of the pair of cross belts with respect to the distance GT and the distance GC has a relationship $GC \leq GB \leq GT$.

12. The tire according to claim 1, wherein
a shoulder drop amount ΔT of the tire outer surface profile at each tread ground contact edge with respect to the tread ground contact width TW has a relationship $0 < \Delta T/(TW/2) \leq 0.05$.

13. The tire according to claim 1, wherein
a width WC of the tire outer surface profile at the position of 70% of the tire cross-sectional height SH with respect to a tire cross-sectional width SW between the two maximum width positions has a relationship $0.90 \leq WC/SW \leq 1.00$.

14. The tire according to claim 1, wherein
the belt layer includes a pair of cross belts, each cross belt being made of a ply of cords covered with a coating rubber and having a pair of end points located at the centers of gravity of the outermost belt cords in the tire width direction, and
a width Wbe between the end points of a wider cross belt of the pair of cross belts with respect to the tread ground contact width TW has a relationship $1.00 \leq Wbe/TW \leq 1.10$.

15. The tire according to claim 1, wherein
a height HD of each tire maximum width position with respect to the tire cross-sectional height SH has a relationship $0.50 \leq HD/SH \leq 0.60$.

16. The tire according to claim 1, wherein
the tire cross-sectional height SH and the tread ground contact width TW with respect to a tire cross-sectional width SW between the two maximum width positions satisfy conditions $0.55 \leq SH/SW \leq 0.65$ and $0.60 \leq TW/SW \leq 0.90$.

* * * * *